US006910998B2

(12) United States Patent
Eberle

(10) Patent No.: US 6,910,998 B2
(45) Date of Patent: Jun. 28, 2005

(54) CENTRIFUGE COMPRISING A BLOOD BAG SYSTEM WITH AN UPPER AND LOWER OUTLET

(75) Inventor: Günter Eberle, Tuttlingen (DE)

(73) Assignee: Andreas Hettich GmbH & Co. KG (DE)

( * ) Notice: Subject to any disclaimer, the term of this patent is extended or adjusted under 35 U.S.C. 154(b) by 114 days.

(21) Appl. No.: 10/220,180

(22) PCT Filed: Dec. 8, 2001

(86) PCT No.: PCT/EP01/14440

§ 371 (c)(1),
(2), (4) Date: Oct. 31, 2002

(87) PCT Pub. No.: WO02/053292

PCT Pub. Date: Jul. 11, 2002

(65) Prior Publication Data

US 2003/0176267 A1 Sep. 18, 2003

(30) Foreign Application Priority Data

Dec. 29, 2000 (DE) ........................................ 100 65 283

(51) Int. Cl.[7] ............................ B04B 7/00; B04B 7/12; B04B 11/00; B01D 21/26

(52) U.S. Cl. ................................ 494/45; 494/2; 494/3; 494/23; 494/26; 494/43; 494/49; 494/56; 494/60; 604/403; 604/408; 604/410

(58) Field of Search ........................... 494/2, 3, 23, 26, 494/43, 45, 49, 56, 60; 604/403, 408, 410

(56) References Cited

U.S. PATENT DOCUMENTS 3,347,454 A 10/1967 Bellamy, Jr. et al.
4,322,298 A 3/1982 Persidsky (Continued)

FOREIGN PATENT DOCUMENTS

DE 2946198 C2 5/1981
DE 2938367 C2 6/1981

(Continued)

OTHER PUBLICATIONS

Search Report German Patent No. 10065283.2 from German Patent Office dated Mar. 27, 2002 (German)(explanation table translated).

(Continued)

*Primary Examiner*—John Kim
(74) *Attorney, Agent, or Firm*—Law Offices of James D. McFarland

(57) ABSTRACT

The invention relates to a centrifuge provided with a blood bag system having an upper and lower outlet for separation of blood constituents, containing a rotor which can be driven in a rotative manner about a hub, wherein at least one conventional whole blood bag equipped with an upper outlet and with a lower outlet can be positioned vertically in this blood bag, while the whole blood bag can be arranged on the rotor in such a way that one outlet of the whole blood bag is bent in a radial direction, and the opposite outlet of the whole blood bag is bent in the other radial direction, so that the entire whole blood bag and the outlets thereof adopt an approximately Z- or S-shaped form in its functional position. In this case it is preferred that the upper outlet of the whole blood bag lie radially toward the interior and the lower outlet of the whole blood bag lie radially toward the exterior of the whole blood bag. The whole blood bag is held in an insert, and the insert is in its turn held by an approximately sector-shaped cartridge, wherein a plurality of such cartridges is uniformly distributed by being arranged around the circumference of the rotor. One advantage of the centrifuge is that conventional blood bags can be used and recovery of individual blood constituents (plasma, erythrocytes, buffycoat) can be achieved with a significantly higher degree of efficiency and functionality, and with a high degree of purity.

35 Claims, 6 Drawing Sheets

U.S. PATENT DOCUMENTS

| | | | | | |
|---|---|---|---|---|---|
| 4,439,177 | A | | 3/1984 | Conway | |
| 4,447,220 | A | * | 5/1984 | Eberle | 494/26 |
| 4,482,342 | A | | 11/1984 | Lueptow et al. | |
| 4,608,178 | A | | 8/1986 | Johansson et al. | |
| 4,720,284 | A | * | 1/1988 | McCarty | 494/37 |

FOREIGN PATENT DOCUMENTS

| | | | |
|---|---|---|---|
| DE | 4340678 | A1 | 6/1995 |
| DE | 19701263 | A1 | 7/1998 |
| EP | 0026417 | A2 | 4/1981 |
| EP | 0350495 | B1 | 1/1990 |
| WO | WO 84/02091 | | 6/1984 |
| WO | WO 95/01842 | | 1/1995 |
| WO | WO 98/35757 | | 8/1998 |

OTHER PUBLICATIONS

International Search Report ( Appn. No. PCT/EP 01/14440) dated Apr. 2002 (German).

* cited by examiner

CENTRIFUGE COMPRISING A BLOOD BAG SYSTEM WITH AN UPPER AND LOWER OUTLET

CROSS-REFERENCE TO RELATED APPLICATIONS

This application is the U.S. National Stage of International Application No. PCT/EP01/14440, filed Dec. 8, 2001, entitled CENTRIFUGE COMPRISING A BLOOD BAG SYSTEM WITH AN UPPER AND LOWER OUTLET, and which is the International Stage of German Application No. 100 65 283.2, filed Dec. 29, 2000.

BACKGROUND OF THE INVENTION

1. Field of the Invention

The invention relates to a centrifuge comprising a blood bag system with an upper and lower outlet for separation of blood constituents.

2. Description of Related Art

EP 0 026 417 B1, filed by the same applicant, discloses a centrifuge comprising a blood bag system, in which the blood bag is provided only with an upper outlet. One disadvantage of this is that recovery of plasma is difficult. In addition, that application involves a swing-out hanger attachment in which the phase boundaries between the individual constituents are formed at a vertical level during the operation of the centrifuge.

EP 0 359 495 B1, on the other hand describes a vertical blood bag system. This vertical system, however, has again the disadvantage that the separation of the constituents is difficult because the extraction is achieved from the middle of a blood bag that is provided with an upper and a lower connection line. This necessitates the insertion of a special blood bag which is thus more expensive to manufacture, and which can moreover be easily burst open. Therefore, upper and the lower connections of the blood bag are not used for delivery of the recovered constituents while the centrifuge is in operation, but instead only a custom-made outlet manufactured in the middle is used.

SUMMARY OF THE INVENTION

One objective of this invention is therefore to further develop a centrifuge having a vertical blood bag system according to EP 0 350 495 B1 in such a way, so that blood bags that are normally commercially available could be utilized, without necessitating special adjustments of the bag. Another objective of the invention is to achieve recovery of the individual constituents with a substantially higher level of efficiency, functionality and with a higher degree of purity.

An essential characteristic of the invention is that a whole blood bag is used with upper and lower outlets, which are arranged in the existing embodiment in the rotor, and that one outlet, for example the upper outlet of this whole blood bag, is bent in a radial direction while the opposite outlet of the blood bag is bent in the other radial direction, so that the whole blood bag adopts in its functioning position comprising its outlets approximately a Z- or S-shape form.

In comparison to prior art, this results in a substantial advantage, namely that a blood bag that is freely commercially available can be used with an upper and a lower outlet, without necessitating the use of a special connection on this blood bag.

It has been in fact proven that with this Z- or S-shaped arrangement of a blood bag which is positioned vertically in the rotor of the centrifuge it is now possible for the first time to use in a clean manner for example the upper outlet, which is directed in the inward radial direction, for recovery of plasma that is being formed on this inward, radial level, while the outlet located opposite in the radially outward direction can be used for recovery of erythrocytes which are also located in the interface of this phase. This results in yet another advantage because the so-called "buffycoat", which is in fact undesirable, can stay in the whole blood bag and it will not be mixed with other constituents.

There are a number of other known inventions according to existing technology, wherein the buffycoat must be transferred to another bag in order to achieve a clean separation between the erythrocytes and the plasma, which is avoided by the invention.

The invention ensures that the undesirable buffycoat will remain in the whole blood bag itself and that the blood bag is a commercially available blood bag, such that it has upper and lower connection lines, which are henceforth used in accordance with the invention, because of the special shaping form of the blood bag in the centrifuge designed to extract the individual constituents which are being formed during the operation of the centrifuge.

In general, it should be pointed out that the blood bag, which is formed in the Z- or S-shape form could be stored during the operation of the centrifuge in the rotor in any desired holder. This means that any desired holder can be used, which is capable of holding the blood bag in the Z or S form, in which bag for example the upper connection line will be formed radially inward, while the lower connection is formed radially outward.

In accordance with this invention, a system having a plurality of chambers is preferred, in which the formed blood bag is held in an insert, while the insert itself is held in a cartridge. The use of this insert and cartridge system has a number of advantages.

A first advantage is that an insert having a relatively simple construction can be used, in which one chamber of the whole blood bag is suspended in the above described Z- or S-form and the connections to the Z- or S-configuration are arranged so that yet another chamber is deployed in this insert enabling to suspend therein a bag serving for recovery of erythrocytes, while another chamber is provided for a bag for recovery of plasma.

Furthermore, it is sufficient when this insert is simply provided with correspondingly guided clamps, wherein these clamps open in a certain centrifuge stage and the transfer of the constituents produced in the blood is thus enabled in individual satellite bag.

These clamps are preferably guided manually when the objective is to put the entire system into the insert during the standstill status, because these clamps will then produce a clamp connection when the small tube is operated by hand in order to disconnect the corresponding supply and outlet tubes.

During the operation of the centrifuge, these clamps are closed as they are spring-loaded and they will be open only at a predetermined stage of the process by a separately controlled force. This force has an effect only for a certain time period, which is controlled by sensors in order to guarantee that the formed constituents will be transferred fully and practically without a residue into the satellite bags. It is possible to use a lifting cylinder as a remote force means controlling the clamps, or an electromagnet, a rotary slide, or other actuation elements that can be remotely operated can be employed. It is also important in this connection that the insert be equipped with the construction of the three chambers using the above described clamped in as simple and inexpensive manner as possible.

The actual controlling elements, which control the clamps are in this case arranged in a cartridge, whereby this cartridge is constructed in the form of sectors so that a plurality of the cartridges can be evenly distributed on the circumference of the rotor. These cartridges are provided with power connections through the hub of the rotor. Each cartridge is equipped with a plug connection, and a corresponding opposite plug is arranged on the hub of the rotor, so that the required signal lines and air supply lines can be fed via these plug connections between the hub of the rotor and the cartridges. It is obviously also possible to use instead of a continuous plug connection for the supply of energy and air also two separate plug connections per cartridge, wherein air is supplied to one of the plug connections and electric energy is supplied to the other plug connection.

Signal lines are simply connected to a sensor, which monitors the transfer of the plasma into the satellite bags and controls the associated clamp, when the sensor detects a coloring caused by another type of constituents in the transfer line. The same clamp is arranged in the extraction line for recovery of erythrocytes. The same clamp can be also actuated manually during the standstill status, and can be also controlled by a remotely controlled actuation element while the centrifuge is in operation. It is therefore important in this respect that the cartridges, which contain the actuation element for the inserts resting therein, are screwed in the rotor relatively tightly, thus forming the machine and actuation part of the insert so that the insert can be formed in as simple manner as possible.

When a similar type of insert is damaged, such an insert can be very easily replaced, even if such an occurrence is caused for example by an unnoticed defect of one or more bags during the operation of the centrifuge. Moreover, the design provides that the cartridges, which accommodate the inserts, can be closed with a transparent cover and that this cover can be locked. This results specifically in the following advantage: passing of the plasma from the whole blood bag into the adjacent whole plasma bag can be observed very easily by means of a stroboscope during the operation of the centrifuge from the upper part through a rotor cover, which is also transparent, in order to control in this manner the function of the sensor which monitors the transfer of the plasma.

This stroboscope is controlled by the number of rotations depending on the number of the rotations of the rotor. In addition to the above described remotely controllable clamps, the design is also provided with a built-in welding apparatus which ensures that the associated pipe lines or the supply tubes will be separated and welded together once the plasma bag and the erythrocyte bag have been fully filled up. In this manner it is thus possible to achieve a fully automatic recovery of plasma and erythrocytes.

Another advantage in comparison to existing art is that because the upright arrangement of the whole blood bag and because of the capability to use a conventional whole blood bag having an upper and a lower connection line, the ability to recover extra pure plasma is now provided for the first time, because due to the Z-shaped deformation of the whole blood bag in the centrifuge chamber of the centrifuge, one outlet of the whole blood bag is directed radially inward and thus brings the constituents produced radially inward into the blood bag for withdrawal, while on the other hand, the radially outward directed connection on the blood bag is deformed in the outward direction in such a way that only this blood bag will now be determined and suitable for withdrawal of the constituents which are formed in the radially outward direction.

It is also essential for the present invention that a radially enclosed compressed air module be deployed, which can be operated for example with a cushion that can be inflated by compressed air. This compressed air module is operated with a pressure slide, which can be moved in a radial direction from within and in the outward direction against the blood bag. This means that the blood bag will be affected by the pressure slide radially inward as it is positioned radially outward in an associated separation wall in the insert.

The blood bag deployed in this manner under pressure removes the plasma through the supply tube and through an open valve (clamp) into the adjacent satellite bag in which the plasma will be contained. Accordingly, after the withdrawal of the plasma constituents, the upper valve is closed again and thereafter, the lower valve for the withdrawal of erythrocytes is open and due to the consequent action of this pressure shield, the erythrocyte constituents will be also extracted when the clamp is open into the associated erythrocyte bag.

It has been established through experiments that the action of the pressure shield is not necessarily required during the withdrawal of the erythrocyte component, it may be sufficient when the effect of the centrifugal force alone is employed to enable the withdrawal of the erythrocyte constituents from the whole blood bag into the erythrocyte bag.

The following is a more detailed explanation of the invention based on the drawings, which serve solely for a representation of an embodiment solution. Further characteristics and advantages of the invention will become evident from the drawings and their description

BRIEF DESCRIPTION OF THE DRAWINGS

For a more complete understanding of this invention, reference is now made to the following detailed description of the embodiments as illustrated in the accompanying drawings, wherein.

DETAILED DESCRIPTION

The invention is described in the following description with reference to the figures, in which like numbers represent the same or similar elements.

Figure 1:
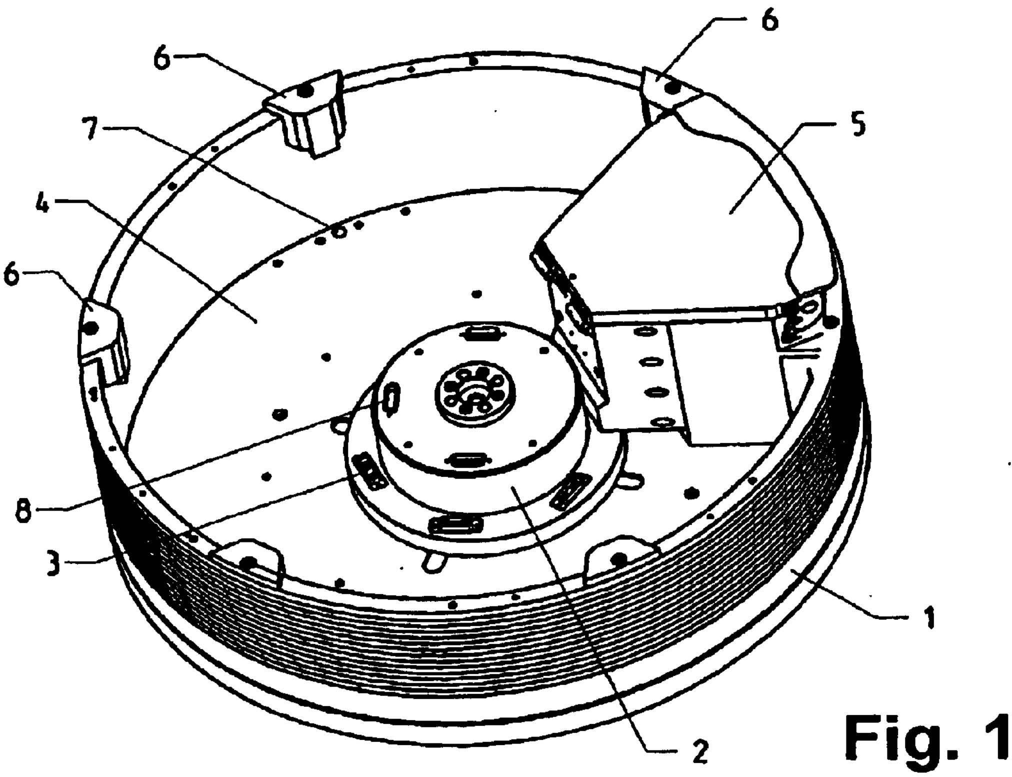
FIG. 1 is a perspective top view of a rotor provided with a single cartridge attached therein.
Figure 2:
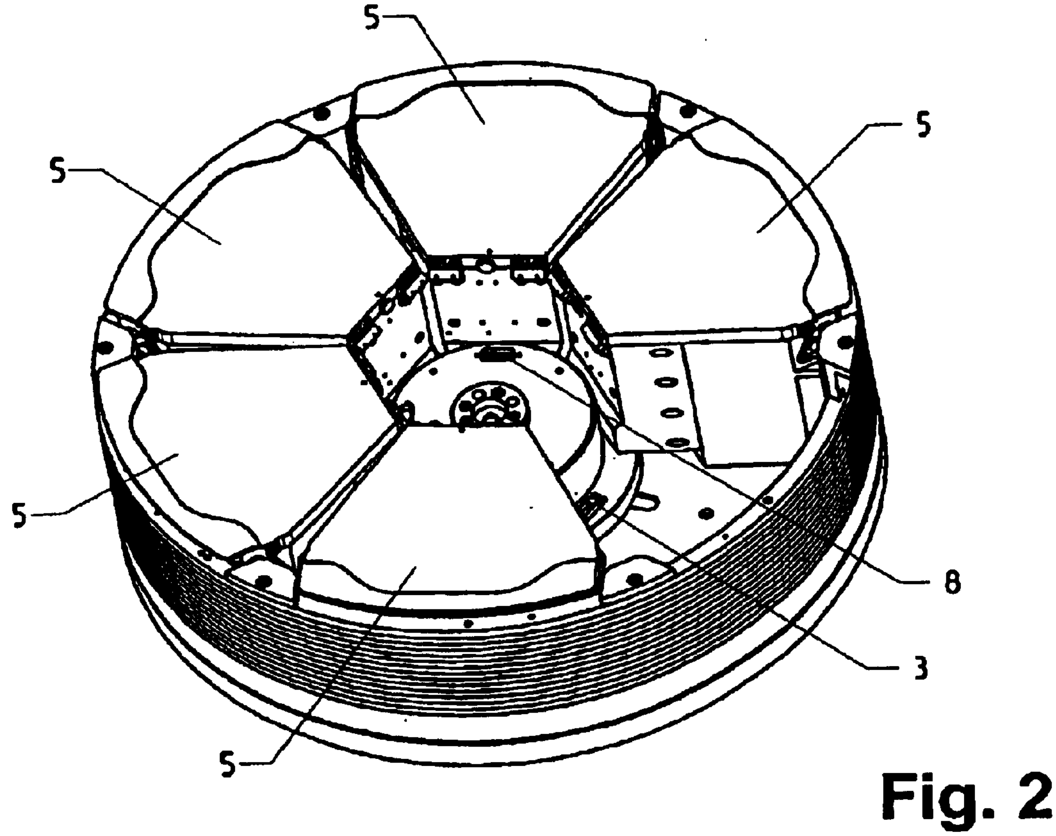
FIG. 2 is the same representation as in FIG. 1 provided with a plurality of cartridges attached therein, wherein one cartridge space is left free for facility of inspection.

In accordance with FIG. 1, a hub 2, which is arranged in a rotor 1, is provided with a plurality of plug connections 3, 8. Through one of these plug connections can be supplied for instance energy for each of the cartridges 5 held therein, while air supplying operations can be conducted via the other plug connections 8. It is, however, also possible for example not to employ the plug connection 8 and supply air and electric energy only through the plug connections 3.

A plurality of cartridges 5 is arranged uniformly in the interior space 4 of the rotor, wherein these cartridges can be built-in between retaining pins 6 in a detachable manner on the circumference of the rotor. In another embodiment form, the cartridges 5 can be connected with the rotor in a fixed manner. Corresponding bores 7 are provided for this purpose in the base of the rotor so that screws passing through these bores connect the base with each of the cartridges 5.

Figure 3:
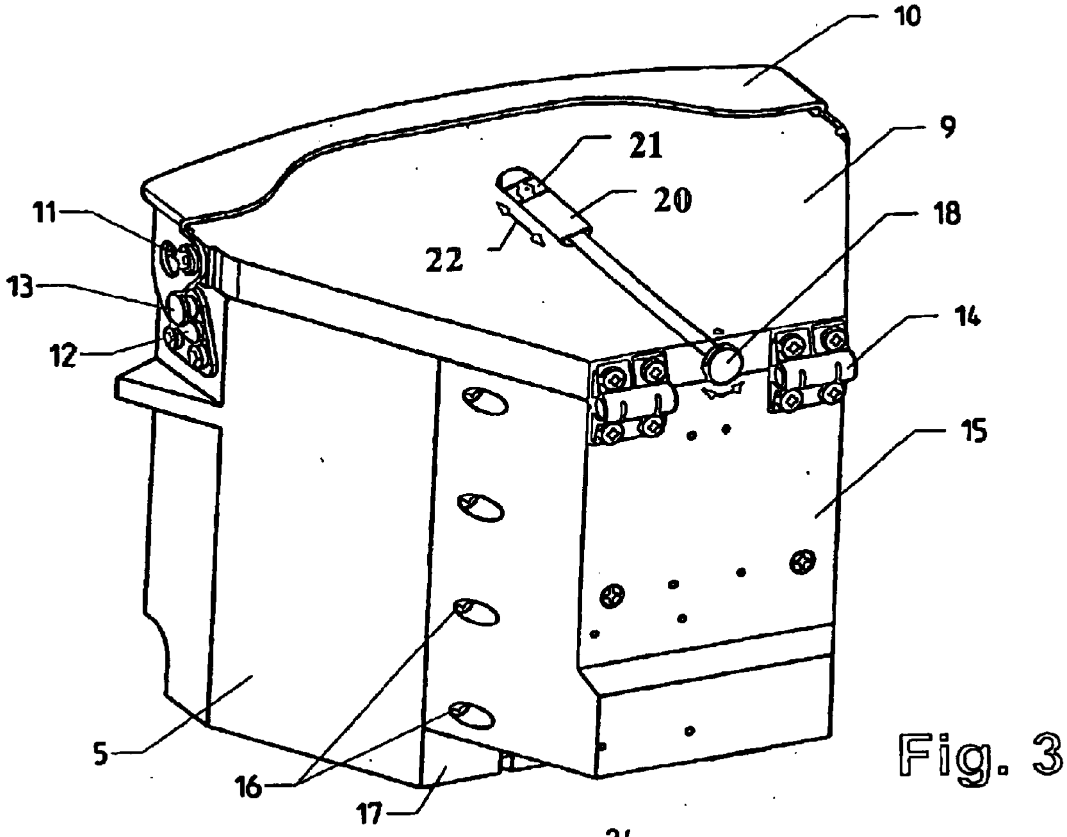
FIG. 3 is a cartridge according to FIGS. 1 and 2 shown in a perspective rear view.
Figure 4:
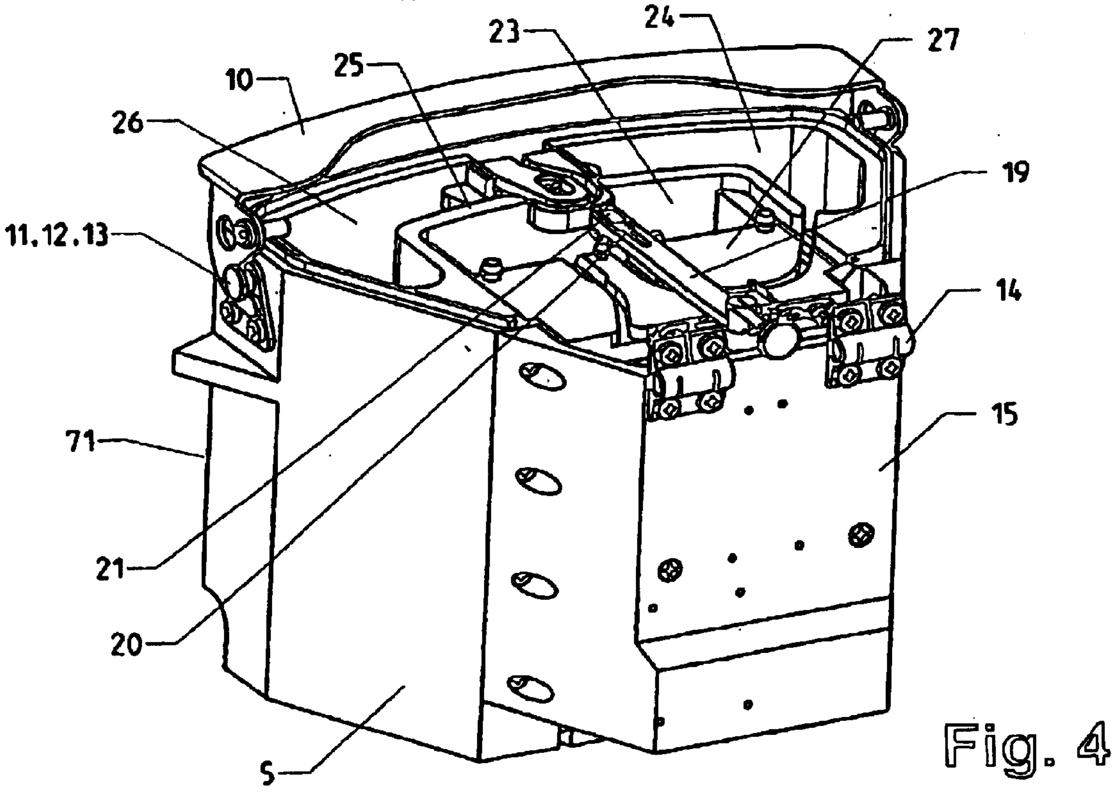
FIG. 4 is the cartridge according FIG. 3 including a representation of further details.

FIGS. 3 and 4 show such a cartridge 5 in more detail. The cartridge is comprised essentially of an outer wall 71 which is employed in a force-locking and form-locking manner on the inner wall of the rotor 1, as well as with a rear part 15 arranged opposite the outer wall 71 that is directed radially toward the hub. On the bottom side of the rear part 15 is arranged the above-mentioned matching plug which interacts with the plug connections 3, 8. The cartridge 5 can be therefore inserted into the rotor from above and the matching plug arranged at bottom part of the real part 15 will then be locked together with the plug connections 3, 8.

The rear part 15 is connected to the rear wall 17 of the cartridge 5 with screws 16. The cover 9 of the cartridge 5 has a transparent design and it supports on its front side (directed radially outward) a closing lid 10, which supports a locking bar 12, thus held in a rotational axis 11 that can be locked with the associated locking pin 13. The swivel hinge 14 of the cover 9 is arranged on the rear part 15.

FIG. 4 also shows that an insert 25 is inserted into the cassette 5, wherein the guide is provided between the cassette 5 and the insert 25 in such a way, so that the insert can be inserted loose and with a clearance for free motion into the cassette. After the actuation elements have been arranged into the rear part 15 of the cartridge as described above, a contrasting arrangement of the actuation elements with respect to the associated surface on insert 25 is thus created as will be explained in more detail later.

It should be further explained with reference to FIG. 3 that the cartridge supports a guide bush 20 in the cover 9, in which is arranged a sensor 21, which is movable in the directions of the arrow 22. The sensor is moved in this case through a shaft 19, which is constructed as spindle and is connected so as to withstand rotations with an adjusting wheel 18. The position of the sensor 21 can therefore be adjusted in this manner continuously in the radial direction. In accordance with FIG. 4, the insert 25 is provided with three chambers 23, 24, 26, which are separated from each other by separating partitions. The chamber 23 serves for accommodation of the whole blood bag 31, while the chamber 24 serves for accommodation of the plasma bag 45, and the chamber 26 serves for accommodation of the erythrocyte bag.

The adapter plate 27 indicated in the figure shows the tube guiding channels, which will be also described later, and it also provides mounting supports for suspension of the whole blood bag 31 having the form of pins. This adapter plate 27 is preferable held in the insert 25 in a detachable manner.

Figure 5:
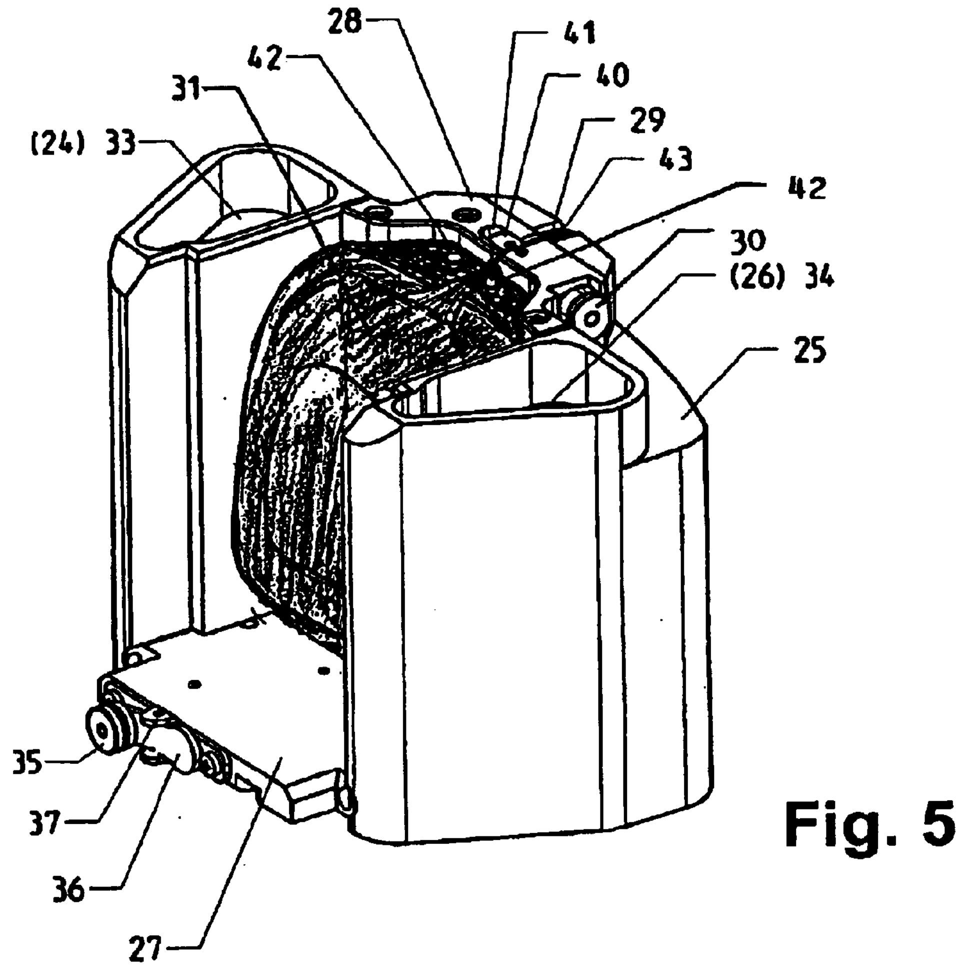
FIG. 5 is an insert to be used in the cartridge seen from the bottom side.

FIG. 5 shows one type of the insert 25 from the bottom side. In this case one can see that the whole blood bag 31 is suspended above, namely in the adapter plate 27, while its lower outlet having the form of a tube 43 is guided between one of the clamping devices. The whole blood bag 31 is also suspended with its lower connecting edge on pings 42, which are arranged in the insert 25. The other chambers 24, 26 of the insert 25 are sealed with corresponding bottoms 33, 34 and closed in the downward direction.

The clamping device arranged on the bottom side is comprised essentially of a manual actuator (hand wheel) 30 which is connected via a shaft or axis with one of the clamps 40 that are slidable in the lengthwise guide hole 41, wherein the hand wheel 30 is initially energized with one of the locking springs, not shown in the figure, in the locking position, so that the clamp 40 holds the tube 43 constantly in a tube guiding channel 29.

Only when a ram deployed in the rear part 15 of the cartridge 5 in the form of a hub cylinder exerts an effect on the manual control 30, the clamp 40 will be moved into the opening position and through flow in the tube will thus be enabled in the tube guiding channel 29. The entire layout is thus arranged in the bottom side 28 of this insert 25, and one can moreover also recognize that on the opposite side of the whole blood bag 31, the adapter plate 27 is also equipped with a corresponding clamp that can be actuated manually, which is comprised also in this case of a manual control 35 that is held spring-loaded in the locking position, wherein the manual control 35 is held at the free movable end with a counterpoise 36 which can be moved around a rotation axis 37.

Figure 7:
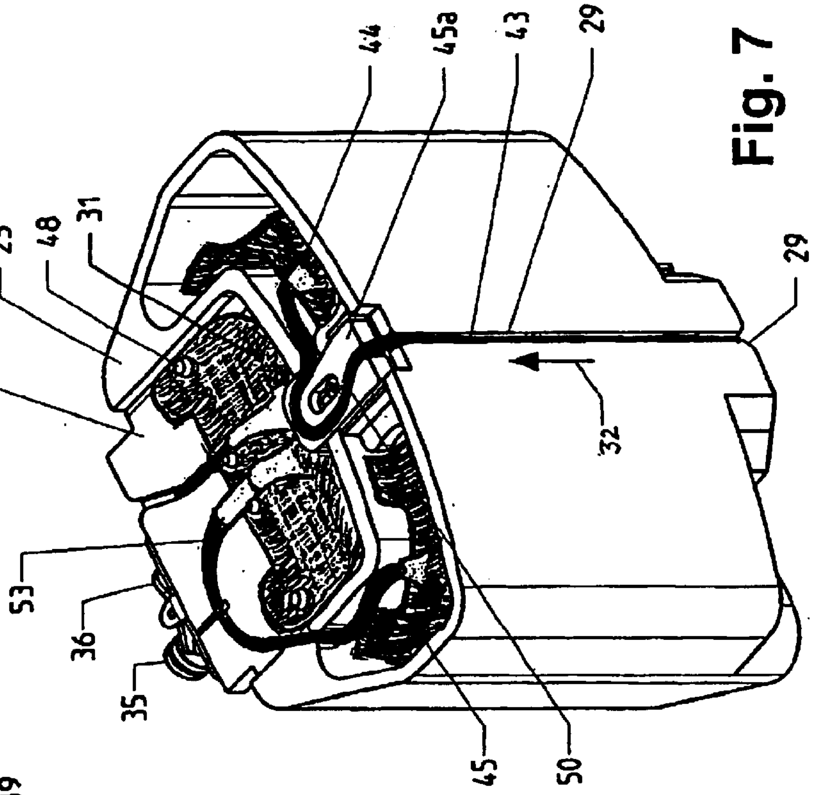
FIG. 7 is the insert according to FIG. 6 seen from the outside and from above; [page 9]
Figure 6:
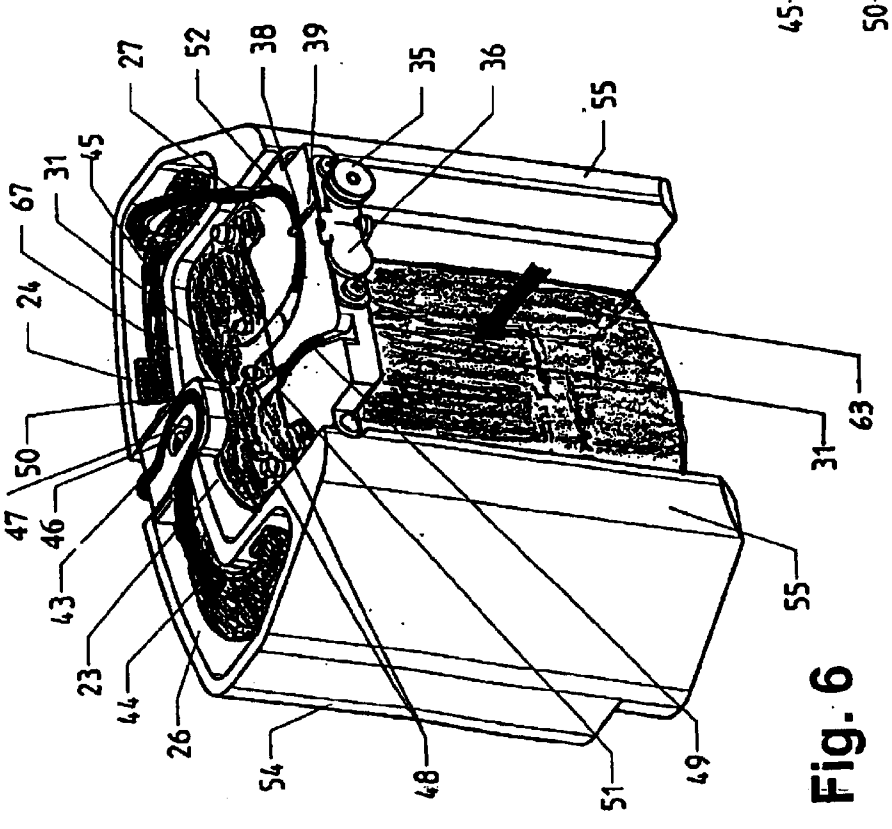
FIG. 6 is the insert according to FIG. 5 seen from the side of the cover.

FIGS. 6 and 7 show other details in the head region of the insert 25. One can see in these figures that the tube 43 is led from the bottom region of the whole blood bag 31 upward through a tube-guiding channel 29 in the direction of the arrow 32 and enters a tube channel 50, which is arranged in the region of the tube guide 45*a*. This tube guide 45*a* is constructed so that it is adjustable in the radial direction and so as to be detectable. A guiding screw 47 thus provides clamping through an oblong hole 46 and can thus be adjusted in this oblong hole. Overflow of the tube 43 in the radial direction can therefore be adjusted with the radial adjustment of the tube guide. In this manner is also determined how much of the erythrocytes should still remain in the buffycoat. The tube 43 thus creates a connection between the whole blood bag 31 and the erythrocyte bag 44, which is specified for recovery of erythrocytes.

Figure 8:
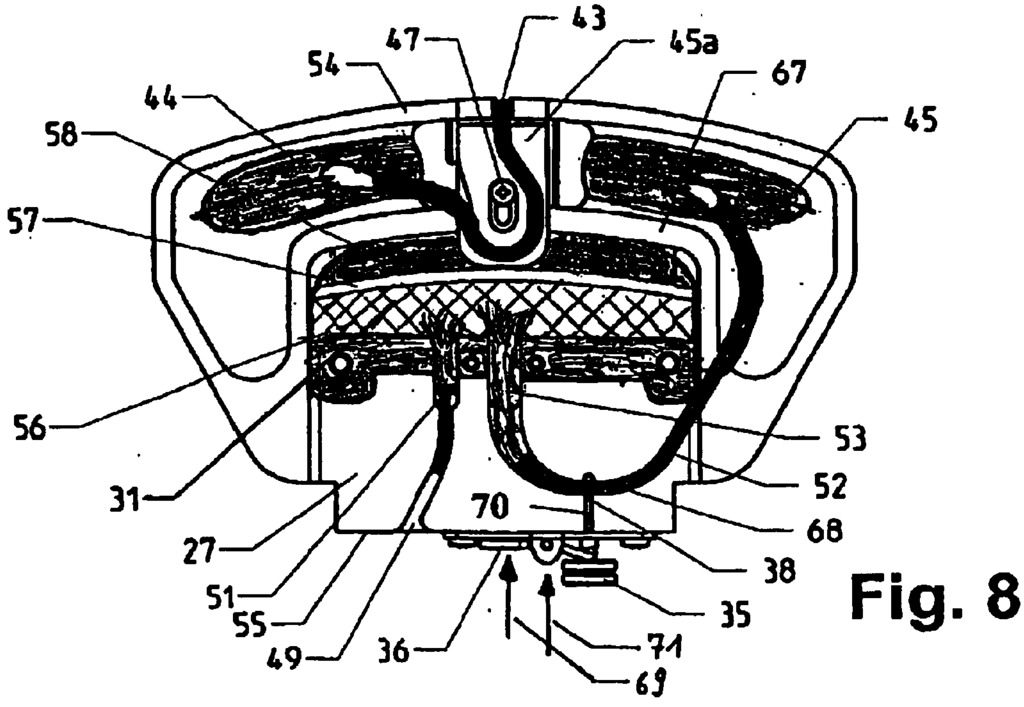
FIG. 8 is the insert according to FIG. 7 seen from directly above.

In addition, one can also see from FIG. 6 how a tube 53 which is used for recovery of plasma protrudes from the head region of the whole blood bag 31, is bent inward therein in the radial direction and leads over the adapter plate 27 through the intermediary of the clamps 35, 36, 38 into the plasma bag 45 in the chamber 24 which serves for recovery of plasma. The clamp which serves for closing of the tube 53 that can be remotely operated as well as manually operated for recovery of plasma is clearly recognizable in FIG. 8 and it is comprised essentially of a clamp 38, tensioned via a spring in the closing position, which is employed at a fixed pin (stop pin 68). The clamp is thus constantly spring-loaded in the closing position so that the plasma tube 53 will be constantly closed. The opening movement can be in this case initiated manually or remotely.

A counterpoise 36 is provided for manual activation. It is mounted on a pivotable rotation axle, which lifts under the effect of actuation force 69 the manual control 35 against the force of the spring 70 and thus opens the clamp 38. Instead of manual activation, which is performed only during the standstill state of the centrifuge, remote control is achieved during the operation of the centrifuge with an actuation ram of an actuation cylinder, not shown in the figure, which is deployed in the rear part 15 of the cartridge 5 and which exerts an effect with its ram on the counterpoise in the direction of the arrow (FIG. 6).

Figure 9:
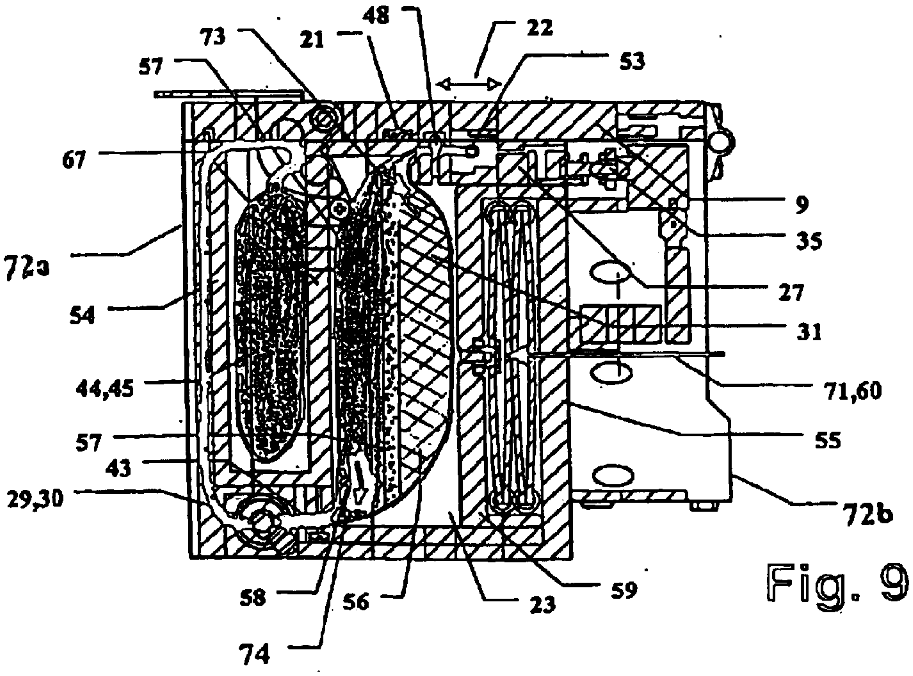
FIG. 9 is a schematic cross sectional view of a cartridge having an insert built therein.

Also important in the representation of FIG. 6 is the fact that the blood bag 31 is now inserted in the chamber 23 in such a way and bent on the side of the head and on the side of the base in such a manner that the bag will create a roughly S-shaped form when seen in a side view as show in FIG. 9. The upper tube 53, which serves for recovery of the plasma is deformed radially inward with its tube connection so that it will be outside of the central axis of the whole blood bag 31, while on the other side in the opposite position at the end of the base of the outgoing tube 43, it is oriented again radially outward, as well as arranged outside of the longitudinal central axis of the whole blood bag 31. This arrangement of the tube connections 43, 53, eccentric on both sides, is achieved only by the corresponding insertion and attachment of the whole blood bag 31 in the chamber 23.

No modifications whatsoever are in this case required on the whole blood bag 31 itself, which means that commercially available whole blood bags can be employed. The advantage of this is that the constituents suggested in FIG. 9 can be formed during the operations of the centrifuge. Plasma 56 is formed in the whole blood bag 31 radially inward with buffycoat 57, which is relatively sharply defined and formed in the central region, while standing and relatively unchanged constituents consisting of erythrocytes are formed radially outward.

It is important in this case that both the inside and outside placed constituents 56, 58 can be extracted without interference in the direction of the arrows 73, 74 outside with a corresponding time control through the opening of the associated clamps, without influencing them in any way or without taking with them the buffycoat 57 itself. This constituent will therefore remain in the whole blood bag 31 and there is no need to process it with another bag, as was the case according to prior art. This also means that there is no need to contaminate with it another bag, which was also unavoidable with the existing state of technology.

Only the two clamps are suggested in FIG. 9 in the head and in the base region of the tube 43, 53. These clamps can be formed as roll tube clamps and they can be also provided with another closing mechanism instead of the spring-loaded mechanism. It is important in this case that clamps be maintained in the working condition in the closing position and that they be brought into the open position only as required for a predetermined period of time when a corresponding signal is issued.

As one can also see from FIG. 9, the mounting of the blood bag 31 occurs in such a way that the pins 48, which are arranged on the adapter plate 27 outside of central longitudinal axis, provide mounting support for the whole blood bag 31. The adapter plate 27 can thus be replaced depending on the type of the used blood bag 31 so that corresponding tube guide channels and attachments with pins 48 will accommodate the whole blood bag 31. The same principle is applied also to the pins 42 in the bottom region 28 and the through passages created therein, which can also fit the blood bag 31 according the to the bag that is used.

Incidentally, it is known that the whole blood bag 31 can support a tube stump 51, which can also be engaged in the adapter plate 27 in the area of a tube channel 49. The plasma tube 53, which is used for recovery of the plasma, is led into a tube channel 52 in the adapter plate 27 (FIG. 6).

Figure 10:
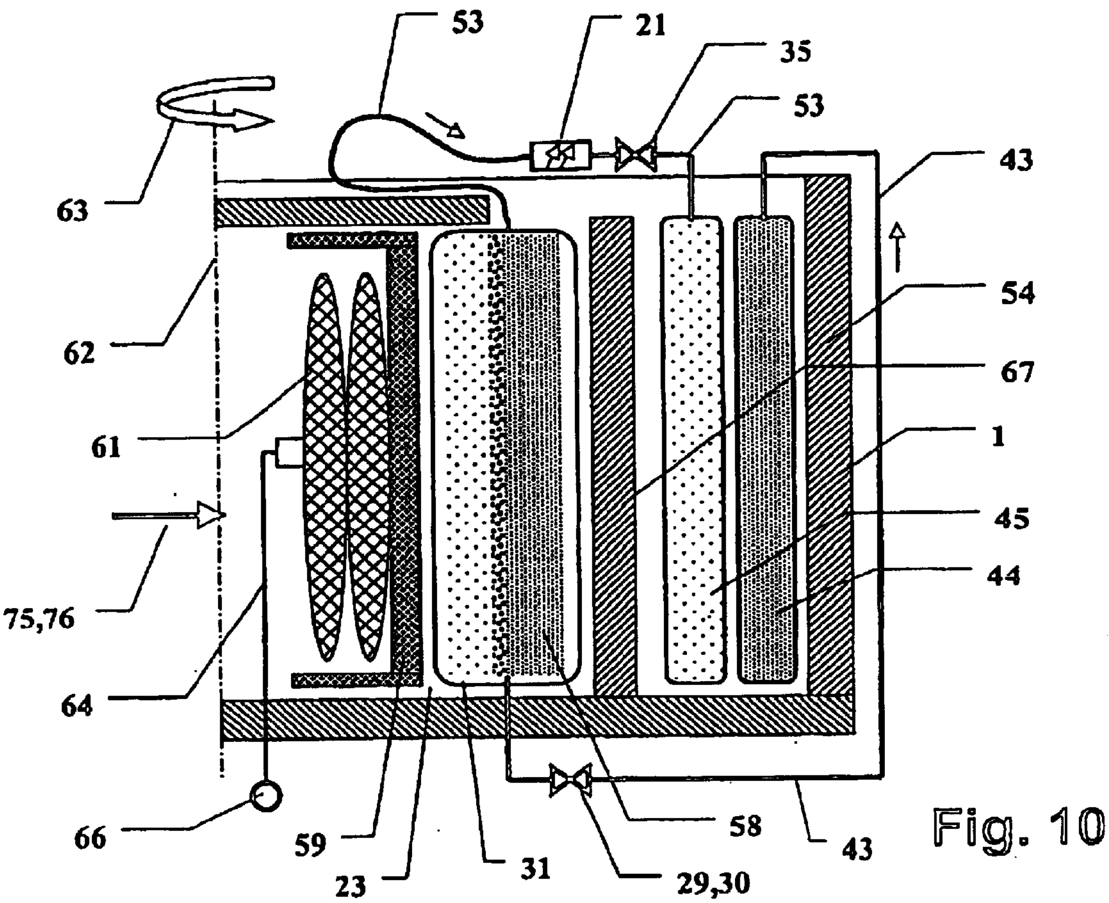
FIG. 10 is a cross sectional view of an arrangement according to FIG. 9 including a representation of further details.

FIG. 10 shows other functional parts of the arrangement, wherein the allocation of the cartridge 5 and of the insert 25 is depicted only by way of an example. The figure only illustrates the fact that the entire arrangement is provided with an outer wall 54, which is deployed radially outward on the inner wall of the rotor 1. The figure depicts a system having a plurality of chambers. It is recognizable that the blood bag 31 is arranged in the chamber 23 in the system.

Figure 11:
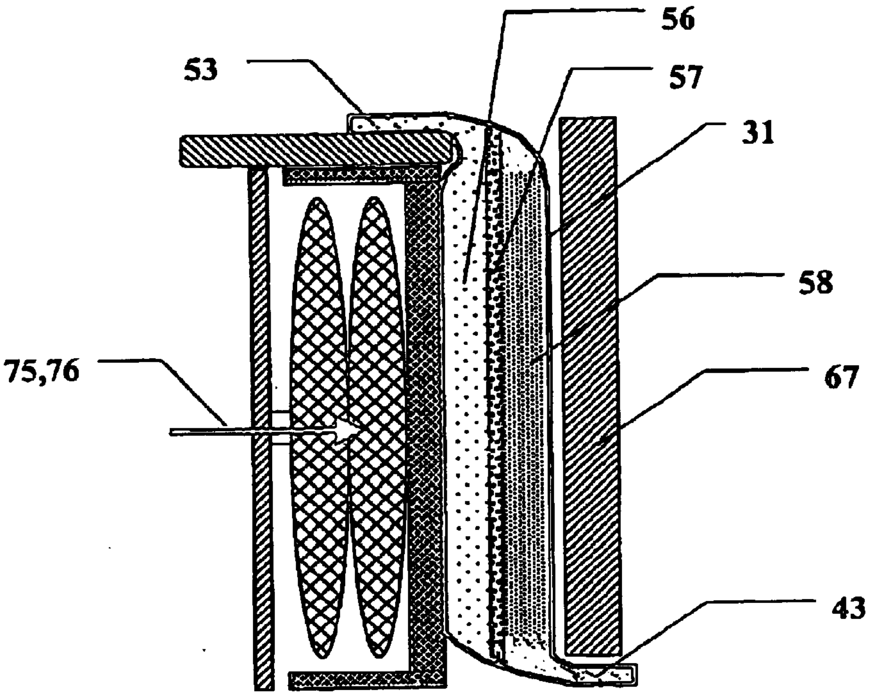
FIG. 11 is a schematic view of the position of the blood bag during the operation of the centrifuge.

A pressure slide 59, arranged radially inward, should be preferably created with a vertical U-shaped profile and it is preferable convexly curved radially outward. A compressed air connection 66 is provided via a tube 64, wherein this compress air connection is connected via the above described 3 plug connections 3 or 8. When the entire pressure module 61 is inflated, a pressure force is achieved in this manner in the direction of the arrow 76, which is acting in the same manner as the centrifugal force 75 (FIG. 11). Therefore, only a relatively small amount of inflating under a low pressure is sufficient to apply the corresponding pressure to the bag 31. As is also shown in the figure, the entire arrangement can be rotated around the rotation axis 62 for example in the direction of the arrow 63.

FIG. 11 indicates in a schematic manner the extraction of the individual constituents during the operation of the centrifuge. As one can see from the figure, an approximately Z-shaped form of the whole blood bag is adopted and the resulting buffycoat constituents 57 are retained in the central region of the blood bag 31, while one of the constituents, (plasma) 56 is conducted away through the pipe connection 53, and the other constituents, (erythrocytes) 58 are conducted downward through the pipe connection 43.

It is important in this respect that the pipe connection 53 be directed radially inward and that the pipe connection 43 be directed radially outward. Because of this special Z-shaped form alone, a conventional blood bag having an upper and a lower connection is suitable when deployed in the vertical position for extraction of the various constituents 56, 58 as it enables withdrawal upward and downward.

Figure 12:
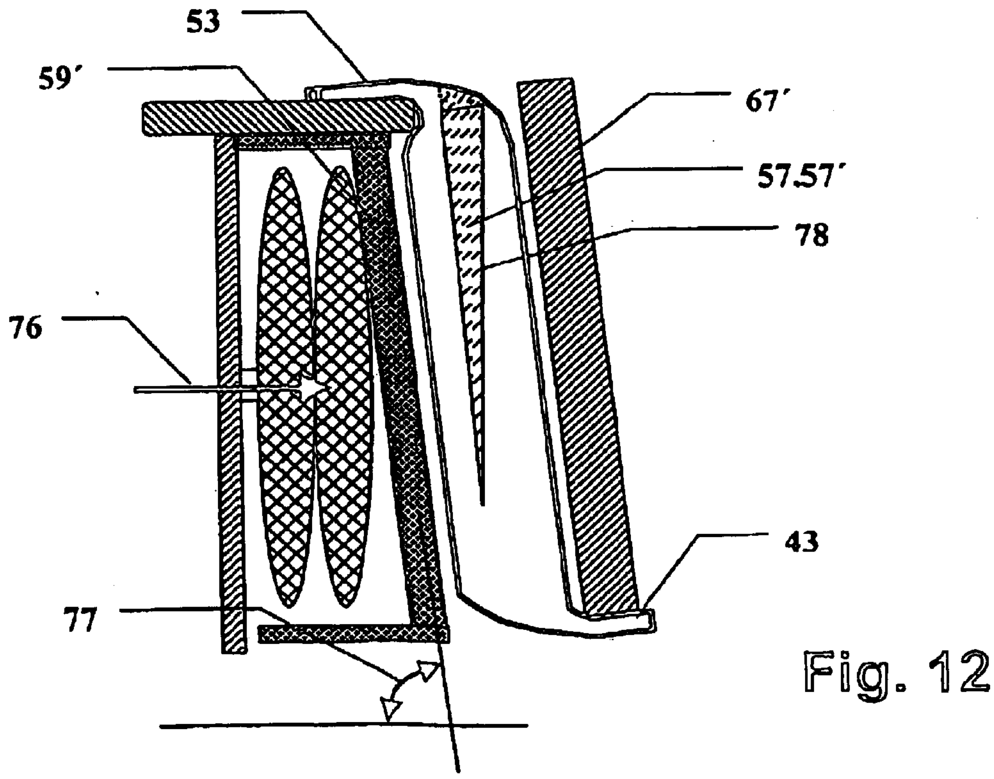
FIG. 12 is a modified embodiment with respect to FIG. 11.

FIG. 12 depicts a modified embodiment, characterized by a slanted posture of the pressure slide 59', which is inclined in the vertical direction by angle 77, and by a corresponding slanted posture of the associated adjoining chamber wall 67' forming a wedge-shaped construction of the resulting buffycoat 57 which will thus be formed in this manner. This results in a significant advantage, namely that when the pressure slide 59' is moved in the direction of the arrow 76, pressure will be applied first in the lower region of the blood bag 31, so that the buffycoat 57 will be formed further up in a wedge-shape which is expanding in the upward direction.

As soon as the position of the buffycoat 57' is extended upward, as shown in FIG. 12, the plasma will be in an inclined position, which is a signal for a light sensor 21 deployed above in the cover region to close the associated clamp 35. This circumstance should be programmed via a corresponding microprocessor control and it will depend upon the sensitivity and the color change to which the light sensor is set.

In addition, the sensor can be also shifted in the radial direction as is indicated by the arrow direction 22 in FIG. 9. The sensor is positioned on the boundary between the constituents of the buffycoat 57 toward plasma 56 to make it possible to detect immediately a shifting of this boundary in the direction toward the plasma tube 53 and to close the corresponding clamp 35. This among other things also ensures that a remaining supply of plasma is retained in the blood bag 31 to prevent in a secure manner contamination of the plasma bag 45 by the buffycoat 57. The remaining plasma also serves to provide nutrition for the thrombocytes.

FIG. 9 further indicates that the inset 25 too is equipped with an inner wall 55, which forms a border of the chamber wall and which is arranged on the other side of the pressure slider 59. In case of FIGS. 9 and 10, it is also important that both the dead weight 71 of the pressure slide 59 and the centrifugal force 75 are directed radially outward in the direction of the arrow 60 to make it possible to generate a very strong force with a very low power-drive of the pressure slide 59. FIG. 9 also shows a radially outward arranged outer wall 72*a* and a radially inward arranged inner wall 72*b* of the cartridge 5. The wedge shape of the buffycoat 57' is indicated in FIG. 12 with the reference symbol 78.

The overall advantage of the above described technical version is therefore that a clean recovery of plasma and erythrocytes is enabled which is operationally safe and free of contaminants, wherein the processing is conducted with commonly used and commercially available bags. The recovery is conducted automatically and no manual intervention is required.

It is essential in the case of the present invention that the blood bag be inserted into the accommodating chamber in an upright standing form, so that its connection regions on the side of the head and on the side of the base will be positioned outside of the central axis (when applied to an unformed blood bag suspended in a straight line). Only this arrangement makes it possible to guarantee that these connecting regions will no longer be within the range of the buffycoat zone formed in the central region.

In this respect it does not matter whether the discharge region which serves for the recovery of plasma, (in this embodiment it is the head region of the blood bag), is located in the upper or in the lower part. It is also possible to use a blood bag built into the system in such a way that the connection tube used for the recovery of plasma is located below and, conversely, the connection tube used for the recovery of erythrocytes is located above.

It is further also essential that both connecting regions be positioned diametrically opposite each other, that is to say that one connecting region be deployed in the opposite direction to the other connecting region. In this case it does not matter if for example the upper connecting region is used for recovery of plasma in a radial line in the direction toward the rotational axis of the centrifuge, while the other connecting region is located diametrically opposite on an outwardly radial line directed away from the hub of the rotor.

It is obviously also possible that these connecting regions are not aligned exactly on a radial line, they can be also formed at an angle to the radial line, provided that they lie diametrically opposite each other and that they have in each case only a continuous connection to the whole blood constituents which are being formed on each side.

Instead of the above-described Z-shape of the blood bag it is also possible to employ an S-shape in accordance with the present solution. An arc-shaped removal design of the connection tubes 43, 53 in front of the blood bag 31 is allowed.

Neither is it necessary according to the present solution for the satellite bags 44, 45 to be located on the same circumference level of the rotor 1. The bags can be also arranged on completely different circumference levels. The same is true also about the arrangement of the chamber for accommodation of the while blood bag. This bag is arranged in the embodiment example radially inward in comparison to the satellite bags 44, 45 that are arranged on the same circumference level so that they are directed radially outward therein. It is also possible to arrange this whole blood bag 31 on a circumference level which lies radially outward in comparison to the more radially inwardly arranged satellite bags 44, 45.

Glossary of Symbols

The following is a glossary of symbols:

| | |
|---|---|
| 1 rotor | 35, 32 arrow direction |
| 5,2 hub | 33 bottom |
| 3 plug connection | 34 bottom |
| 4 interior space | 35 manual control (clamp) |
| 5 cartridge | 36 counterpoise |
| 6 retaining pin | 40, 37 rotation axis |
| 10,7 bore | 38 damp |
| 8 plug connection | 39 guide |
| 9 cover | 40 clamp |
| 10 closing lid | 41 guide |
| 11 rotation axis (locking bar) | 45, 42 pins |
| 15, 12 locking bar | 43 tube (blood bag 31) |
| 13 locking pin | 44 bag for erythrocytes |
| 14 swivel hinge | 45 bag for plasma |
| 15 rear part | 45a tube guide |
| 16 screw | 50, 46 oblong hole |
| 20, 17 rear wall | 47 guiding screw |
| 18 adjusting wheel | 48 pin |
| 19 shaft | 49 tube channel |
| 20 guide bush | 50 tube channel |
| 21 sensor | 55, 52 tube stump |
| 25, 22 arrow direction | 52 tube channel |
| 23 chamber (blood bag) | 53 plasma tube |
| 24 chamber (plasma) | 54 outer wall |
| 26 chamber (erythrocytes) | 55 inner wall 56 plasma |
| 30, 27 adapter plate | 57 buffycoat 57' |
| 28 bottom side | 58 erythrocytes |
| 29 tube guiding channel | 59 pressure slide |
| 30 manual control | 5, 60 arrow direction |
| 31 whole blood bag | 61 pressure module |
| 62 rotation axis | 72a outer wall |
| 63 arrow direction | 72b inner wall |
| 64 tube | 73 arrow direction |
| 10, 66 compressed air connection | 74 arrow direction |
| 67 separating wall 67' | 20, 75 centrifugal force |
| 68 stop pin | 76 force of pressure |
| 69 actuation force | 77 angle |
| 70 spring | 78 wedge shape |
| 15, 71 dead weight | |

What is claimed is:

1. A blood bag system for separation of blood constituents when positioned and centrifuged within a centrifuge with a central hub, comprising at least one cartridge that holds a blood within said centrifuge, said cartridge arranging said blood bag to provide an upper outlet and a lower outlet for the blood such that one of said upper and lower outlets is bent in a first radial direction away from said central hub, and the other of said upper and lower outlets is bent in a direction opposite said first radial direction.

2. The blood bag system according to claim 1, wherein said blood bag is arranged vertically within said centrifuge, and said upper outlet lies radially inward toward said central hub when said cartridge is positioned within said centrifuge, and said lower outlet lies radially outward toward au exterior of said centrifuge when said blood bag system is positioned within said centrifuge.

3. The blood bag system according to claim 2, wherein said upper outlet is situated to enable withdrawal of plasma from said blood bag and said lower outlet is situated to enable withdrawal of erythrocytes from said blood bag.

4. The blood bag system according claim 2, wherein said blood bag is positioned vertically within said blood bag system such that a central axis is defined along a longitudinal center of said blood bag towards which a buffycoat is formed when said blood bag system is centrifuged, and wherein said outlets are situated in such a way so that they are offset from said central axis thereby causing said buffycoat to remain substantially in said blood bag when said outlets are opened and said blood constituents are separated therefrom.

5. The blood bag system according to claim 1, further comprising an insert in which said blood bag is positioned within said cartridge.

6. The blood bag system according to claim 5, wherein said cartridge is attachable to said centrifuge, and wherein said insert is positioned within said cartridge.

7. The blood bag system according to claim 6, further comprising a plurality of cartridges attachable to said centrifuge.

8. The blood bag system according to claim 7, wherein said cartridge has an approximately sector shape such that a plurality of said cartridges may be distributed approximately uniformly within the centrifuge.

9. The blood bag system according to claim 6, wherein said cartridge is configured to detachably connect to the centrifuge, and wherein said insert detachably connects to said cartridge.

10. The blood bag system according to claim 9, further comprising retaining means for detachably connecting said cartridge to the centrifuge.

11. The blood bag system according to claim 6, wherein said cartridge further comprises a cover selected from one of translucent and transparent.

12. The blood bag system according to claim 1, further comprising at least one erythrocyte bag and at least one plasma bag inserted within said blood bag system.

13. The blood bag system according to claim 12, further comprising an insert positioned within said blood bag system, wherein said erythrocyte bag and said plasma bag are positioned within said insert.

14. The blood bag system according to claim 13, wherein said insert further comprises separate chambers and wherein said erythrocyte bag and said plasma bag are inserted within said chambers.

15. The blood bag system according to claim 6, wherein said blood bag is positioned vertically within said such that a central axis is defined in a vertical central axis of said blood bag towards which a buffycoat is formed and away from which said blood constituents are formed when said blood bag system is centrifuged, and further comprising clamps positioned respectively adjacent to said outlets on said insert and configured to open and close said outlets for enabling and disabling transfer of said blood constituents from said blood bag into said plasma and erythrocyte bags respectively.

16. The blood bag system according to claim 15, further comprising a spring attached to each of said clamps and means for controlling said clamps, wherein pressure from said spring causes said clamps to close and wherein said means for controlling said clamps causes said clamps to become open or closed during operation of said centrifuge.

17. The blood bag system according to claim 15, further comprising a sensor that activates and deactivates said clamps.

18. The blood bag system according to claim 17, wherein said sensor includes means for determining the amount of said buffycoat within said blood bag.

19. The blood bag system according to claim 18, wherein said blood bag has an upper region, and wherein said means for determining the amount of said buffycoat within said blood bag includes means for measuring at least one of a width and a color of said buffycoat at said upper region of said blood bag.

20. The blood bag system according to claim 17, wherein said sensor is constructed to move radially with respect to said centrifuge.

21. The blood bag system according to claim 15, wherein said clamps are disposed in said cartridge.

22. The blood bag system according to claim 1, further comprising means for providing at least one of energy and compressed gas to said cartridge.

23. The blood bag system according to claim 1, further comprising welding means for welding said blood, plasma and erythrocyte bags such that they are hermetically sealed.

24. The blood bag system according to claim 1, further comprising a pressure module disposed radially inward from said cartridge and configured to exert pressure on said blood bag in a radially outward direction with respect to said centrifuge, thereby impacting said blood bag with said pressure.

25. The blood bag system according to claim 24, wherein said pressure module comprises a cushion inflatable with compressed gas and a pressure slide adjacent to said blood bag to exert said pressure onto said blood bag when said cushion is inflated with compressed gas.

26. A centrifuge for separation of blood constituents, comprising a. a rotor and a central hub, wherein said rotor includes a periphery; and b. a blood bag system situated within said rotor, said blood bag system arranging a blood bag to provide with an upper outlet and a lower outlet such that one of said upper and lower outlets is bent in a first radial direction and the other of said upper and lower outlets is bent in a direction opposite said first radial direction.

27. The blood bag system according claim 26, wherein said blood bag is positioned vertically within said blood bag system such that a central axis is defined along a vertical central axis of said blood bag towards which a buffycoat is formed when said blood bag system is centrifuged, and wherein said outlets are bent in such a way so that they am offset from said central axis thereby causing said buffycoat to remain substantially in said blood bag when said outlets are opened and said blood constituents are separated therefrom.

28. The centrifuge according to claim 26, wherein said blood bag system comprises a cartridge attached to said centrifuge.

29. The centrifuge according to claim 28, further comprising a plurality of said cartridges attached to said centrifuge.

30. The centrifuge according to claim 29, wherein said plurality of cartridges each have an approximately sector shape such that said plurality of cartridges may be distributed approximately uniformly around said centrifuge.

31. The centrifuge according to claim 28, wherein said rotor comprises retaining means for detachably connecting said cartridge to said centrifuge.

32. The centrifuge according to claim 26, further comprising means for providing at least one of energy and compressed gas to said blood bag system.

33. The centrifuge according to claim 26, wherein said means for providing at least one of energy and compressed gas to said blood bag system is located on said hub.

34. The centrifuge according to claim 26, further comprising a pressure module disposed radially inward from said blood bag system and configured to exert pressure on said blood bag in the radially outward direction with respect to said centrifuge, thereby impacting said blood bag with said pressure.

35. The centrifuge according to claim 34, wherein said pressure module comprises a cushion inflatable with compressed gas and a pressure slide adjacent to said blood bag to exert said pressure onto said blood bag when said cushion is inflated with compressed gas.

* * * * *